July 28, 1959
S. VORECH
2,897,012
RELAY EMERGENCY VALVE
Filed April 7, 1955
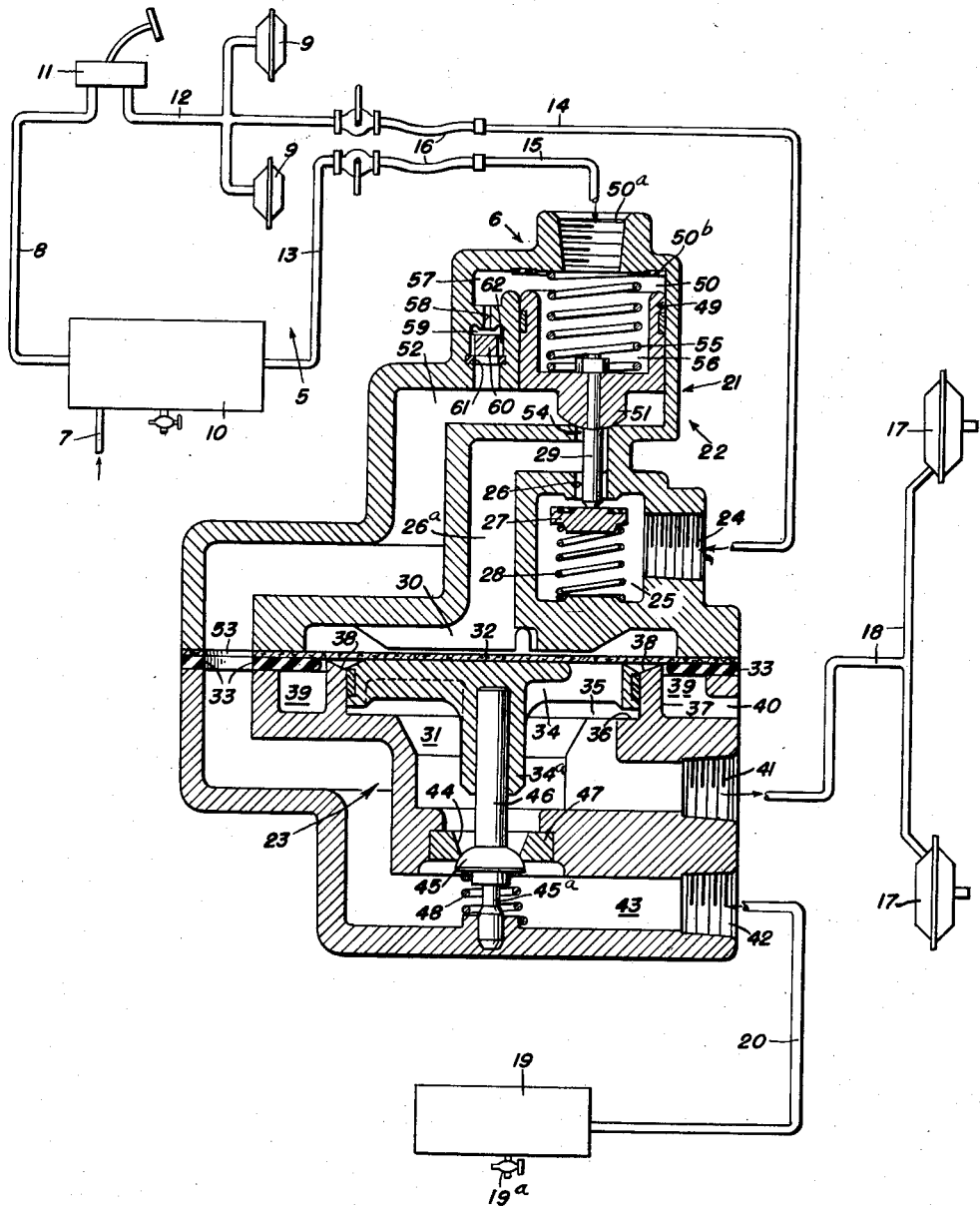
INVENTOR
*STEPHEN VORECH, DECEASED
BY MARGARET VORECH,
ADMINISTRATRIX*
BY *Scrivener & Parker*
ATTORNEYS

United States Patent Office 2,897,012
Patented July 28, 1959

2,897,012
RELAY EMERGENCY VALVE
Stephen Vorech, deceased, late of Elyria, Ohio, by Margaret Vorech, administratrix, Elyria, Ohio, assignor to Bendix-Westinghouse Automotive Air Brake Company, Elyria, Ohio, a corporation of Delaware Application April 7, 1955, Serial No. 499,829

9 Claims. (Cl. 303—29)

This invention relates to valve mechanisms for fluid pressure braking systems and more particularly to an improved relay emergency valve for applying automatically the brakes on a trailer in the event of loss of braking pressure between the tractor and trailer.

Relay emergency valves for use in connection with applying brakes on the trailer of a tractor-trailer combination usually comprise a diaphragm-operated relay valve controlled by service pressure from the tractor to admit fluid pressure stored in a trailer reservoir to the trailer brake chambers. In the event of loss of pressure between the tractor and trailer a normally closed emergency valve is automatically opened to admit full trailer reservoir pressure to the trailer brakes to effect an emergency setting of the trailer brakes. In prior valves of the type outlined the relay valve diaphragm is generally subjected only to service line pressure for normal brake operation whereas the emergency valve is controlled by a second diaphragm, the opposite sides of which are respectively exposed to tractor reservoir pressure and to trailer reservoir pressure. Upon an unbalance of pressures occurring, as a result, for example, of trailer breakaway, trailer reservoir pressure acts on the emergency valve diaphragm to move it from its normal balanced position to open the emergency valve and admit full trailer reservoir pressure to the trailer brakes. It will be apparent that with this arrangement at least two separate diaphragms are required each having an associated valve mechanism.

The relay-emergency valve of the present invention eliminates much of the complexity of the prior art relay emergency valves by so arranging the emergency valve with respect to the relay valve that the diaphragm of the latter serves a dual function in that it is subjected to service line pressure from the tractor reservoir during normal brake operation but during an emergency operation it receives pressure from the trailer reservoir. Hence one object of the present invention is to provide an improved relay emergency valve having a single diaphragm which may be alternatively controlled by service pressure or by emergency pressure to apply the brakes depending upon whether normal or emergency pressure conditions exist between the tractor and trailer.

Another object of the invention is to provide an improved relay-emergency valve wherein the emergency setting of trailer brakes is automatically controlled by severe pressure loss between the tractor and trailer.

Yet another object of the invention is to provide an improved relay-emergency valve for a trailer which automatically sets the brakes on the trailer in the event of pressure loss between the tractor and trailer and retains the brakes in set condition until normal pressure has been restored in the braking system.

Other objects and their attendant advantages will become apparent as the following detailed description is read in conjunction with the accompanying drawing wherein the single figure illustrates the present invention in connection with a tractor-trailer braking system, one form of relay-emergency valve embodying the present invention being shown in section.

A portion of a braking system carried by a tractor is shown diagrammatically at 5 and the trailer system embodying the present invention is diagrammatically shown at 6. The tractor system comprises a main reservoir 10 supplied with fluid pressure through a conduit 7 connected with the usual compressor (not shown). A conduit 8 connects the reservoir 10 with a conventional manually controlled brake valve 11 which controls the admission of fluid pressure from the tractor reservoir 10 to a service pipe 12 which is connected to the tractor brake chambers 9 (two only shown) and leads to the rear of the tractor. An emergency pipe 13 is connected to the tractor reservoir 10 and also leads to the rear of the tractor where both it and service pipe 12 are connected to corresponding trailer pipes 14 and 15 by means of conventional flexible couplings 16. The trailer braking system includes in addition, brake chambers 17, brake chamber conduits 18, a trailer reservoir 19 and trailer reservoir conduit 20, all of the foregoing being interconnected through a relay-emergency valve embodying the present invention.

The valve mechanism illustrated comprises a valve body 21 enclosing an emergency valve designated generally by the numeral 22, and a relay valve designated generally by the numeral 23. The relay valve is normally operated by fluid pressure supplied from the brake valve 11, the fluid pressure being admitted via service conduit 14 to the valve body 21 through port 24 from whence it enters a chamber 25 having a port 26 in the upper wall thereof which is controlled by a check valve 27 biased by spring 28 towards closed position but normally retained in the open position by a depending rod 29 associated with the emergency valve 22, later described in detail. From the chamber 25 service pressure flows from port 26 through passage 26a to a chamber 30 which is separated from a lower chamber 31 by a diaphragm 32 which is sealed at its edges between contiguous portions of the valve body 21 by suitable sealing means 33.

Abutting the lower side of diaphragm 32 is a spider-like diaphragm guide 34 which operates in an upper cylindrical portion 35 of lower chamber 31. When pressure is exerted on the upper side of diaphragm 32 it is depressed to move guide 34 downwardly which movement is limited by a shoulder 36 at the bottom of cylindrical portion 35. It will be observed that this latter portion is surrounded by a vertical annular wall 37 whose upper edge 38 is beveled to provide a seal with the diaphragm 32 when depressed to prevent leakage of fluid from chamber 31 to an annular exhaust channel 39 surrounding the cylindrical portion 35. When the diaphragm 32 is in its normal unflexed condition, any fluid pressure in chamber 31 raises the diaphragm slightly clear of the edge 38 to enable the fluid to escape into the exhaust channel 39 whence it flows to the atmosphere through an exhaust port 40.

Lower chamber 31 is connected with the trailer brake chamber 17 through a port 41 communicating with the brake chamber conduits 18. Fluid pressure for actuating the brakes is derived from the trailer reservoir 19 which is connected by conduit 20 and a port 42 with a passage 43 in the lower portion of valve body 21. From passage 43 pressure is admitted to chamber 31 and hence to the brake chambers through an inlet port 44 which is controlled by an inlet valve 45 mounted on the lower end of a valve stem 46 fixed in a drilled boss 34a integral with the spider 34. The valve 45 cooperates with a valve seat 47 to close port 44 and the valve 45 is normally retained in its closed position by a spring 48 interposed between the lower wall of passage 43 and the bottom of valve 45. A valve stem guide 45a fixed to the bottom of the casing cooperates with a suitable drilled passage (not shown) in the stem 46 to guide the valve 45 and associated elements in their movement.

From the above description it will be seen that a service brake application is effected by admission of pressure to chamber 30 which depresses diaphragm 32 moving guide 34 and valve 45 downwardly against spring 48 to open port 44 and admit fluid pressure from the trailer reservoir 19 to the brake chambers 17 to apply the trailer brakes. When pressure is relieved from the upper side of diaphragm 32, spring 48 returns valve 45 to closed position and spider 34 to the position shown, whereupon the diaphragm is moved slightly upward by the pressure in the brake chambers 17 and chamber 31 to connect the latter with the atmosphere as above explained.

In normal operation fluid pressure to the upper side of diaphragm 32 is derived from the main reservoir 10 on the tractor under the control of the brake valve 11. However, in the event of tractor-trailer breakaway or in the event of severe pressure loss between the tractor and trailer, an emergency application of the trailer brakes is automatically effected through the action of the emergency valve 22 which serves to admit trailer reservoir pressure to diaphragm 32 while simultaneously shutting off the service line connection to said diaphragm. Thus under these conditions the diaphragm 32 and inlet valve 45 serve as an emergency diaphragm and valve thereby eliminating extra parts for these members.

With reference to the drawing, the improved means for shifting the normal relay valve mechanism from service usage to emergency usage comprises a differential valve member 49 operable in a cylindrical chamber 50 in the upper portion of the valve body 21. The chamber 50 has a port 50a in the upper wall thereof which communicates directly with the main reservoir 10 on the tractor via the emergency pipes 13 and 15. The valve member 49 has a valve portion 51 which extends downwardly into a passage 52 which communicates through an aperture 53 in the left hand edge of diaphragm 32 with the lower passage 43. A port 54 communicates passage 52 with passage 26a leading to chamber 30 above the diaphragm 32 and this port is normally retained closed by the valve portion 51 through the action of a spring 55 interposed between the upper wall of chamber 50 and the bottom of a cylindrical cavity 56 in the valve member 49. Extending downwardly through the center of valve portion 51 is the heretofore mentioned depending rod 29 which engages and retains open the check valve 27 when the parts of the valve mechanism are in the position shown.

In open communication with the chamber 50 is a smaller chamber 57 having drilled through the bottom a restricted passage 58 communicating with a second small chamber 59 containing a check valve 60 having limited reciprocatory movement between the upper wall of chamber 59 and a suitable retaining ring 61. The check valve 60 is provided with vertical grooves 62 around its circumference which, when the valve 60 is in the lower position shown in the drawing, permit the passage of fluid between chambers 50, 57, 59 and the passage 52. Thus during normal operation of the system fluid passes from the reservoir 10 on the tractor past the check valve 60 to the trailer reservoir 19 whereby the latter is charged to its normal pressure.

However, should there be less pressure in the tractor reservoir 10 than there is in the trailer reservoir 19, fluid flow will be reversed and as the fluid flows reversely through the restricted passage 58, the pressure acting upon the lower surface of the check valve 60 will exceed the pressure in chambers 59, 57 and 50 thus causing the check valve 60 to move to its upper position, cutting off any further flow from trailer reservoir 19 to differential valve chamber 50 so that the force acting on the upper side of valve member 49 is pressure from the tractor reservoir 10 in combination with the pressure of spring 55. This combined pressure under normal conditions will be sufficient to retain the valve member 49 in the lower position shown, so that port 54 between passages 52 and 26a is retained closed by valve portion 51 of valve member 49.

Should, however, the fluid pressure acting on the top of differential valve 49 be dissipated to an appreciable amount as by severe leakage between the tractor and trailer or by trailer break-away, then and in that event the pressure from trailer reservoir 19 acting through the passages 43 and 52 upon the bottom surface of valve 49 will be sufficient to overcome the force of the spring 55 thereby moving valve member 49 upwardly to open port 54 to trailer reservoir pressure. Immediately upon the raising of valve portion 51, the fluid pressure receiving area beneath valve member 49 is increased by the area of valve portion 51 which was cut off by the edges of port 54. Thus valve 49 snaps to its upper position where its upper edge sealingly engages a ring 50b which may serve to prevent any loss of pressure which may leak past the closed check valve 60.

Simultaneously with the upward movement of valve member 49 the depending rod 29 is withdrawn from check valve 27 allowing the same to close port 26 by the pressure of its spring 28. Trailer reservoir pressure then flows through port 54 to passage 26a and to chamber 30 where it acts on the diaphragm 32 to depress the same and open inlet valve 45 to admit trailer reservoir pressure to chamber 31 to apply the brakes. Since the area of the diaphragm exposed to the pressure in chamber 30 exceeds the area on the other side of the diaphragm defined by the edges 38 of annular wall 37, the diaphragm remains in its depressed condition so long as its upper side in chamber 30 is exposed to the pressure of trailer reservoir 19. It will be observed that since all means of fluid pressure escape between reservoir 19 and the brake chambers 17 have been closed and are retained closed by the pressure in the system and by spring 28 closing port 26, the trailer brakes must remain applied until either the system is manually drained of pressure, as by opening the usual drain cock 19a on reservoir 19, or until operating pressure is restored between the tractor and trailer. Upon this latter occurrence, operating pressure from the main reservoir 10 acts on the top of differential valve member 49 until this pressure in combination with the force of spring 55 is sufficient to overcome the trailer reservoir pressure acting beneath valve member 49 whereupon it moves to the position shown, closing port 54 and opening port 26 to the service piping 14, 12 and brake valve 11 thus exhausting pressure above the diaphragm 32 through the brake valve in the usual manner.

After normal brake operation is restored check valve 60 may remain in its closed position so long as the pressure in trailer reservoir 19 exceeds the pressure in tractor reservoir 10. However, when the pressure of the latter rises above that of the former, check valve 60 moves to the position shown and main reservoir fluid flows to tractor reservoir 19 to charge it to its normal pressure as hereinbefore described.

From the foregoing description the operation of the improved valve mechanism of the present invention should be apparent. It will be observed that the mechanism of the present invention is quite simple and considerably less complex than valve mechanisms of the prior art. By utilizing trailer reservoir pressure to actuate the relay valve diaphragm, normally controlled by service line pressure, the valve mechanism of the invention eliminates emergency valve diaphragms and related valve structures which has been common to the prior art. It will be obvious to those skilled in the art, that the emergency valve portion of the present invention need not be enclosed in the same valve body as the diaphragm operated valve and separate units with interconnecting piping is contemplated as being within the purview of the invention. Furthermore, it should be apparent that various other modifications and arrangements could be incorporated in the described device of the present invention without departing from the scope and spirit of the appended claims.

What is claimed is:

1. In a fluid operated tractor-trailer braking system of the type having a main fluid pressure reservoir on the tractor, a fluid pressure reservoir on the trailer, brake chambers on the tractor and trailer, emergency and service lines connected with the tractor reservoir, and a brake valve in the service line on the tractor, a relay emergency valve on the trailer comprising a casing having a fluid pressure responsive member therein dividing the casing into an inlet chamber and an outlet chamber, means for connecting said emergency line with the trailer reservoir, a valve operable by movement of said member for connecting the trailer reservoir and outlet chamber, means for connecting the service line to the inlet chamber so that fluid pressure conducted thereto will move said member and operate said valve to apply the trailer brakes in service, means to conduct fluid pressure from the trailer reservoir to said inlet chamber to apply the trailer brakes in emergency, said last named means including a differential valve device operable in accordance with the differential in pressures existing in the emergency line and in the trailer reservoir, and resilient means acting on said differential valve device for normally maintaining the latter in closed position to prevent communication between the trailer reservoir and the inlet chamber.

2. The braking system as set forth in claim 1 wherein the differential valve device has an area subjected at all times to the fluid pressure in the emergency line and another area subjected at all times to the fluid pressure in the trailer reservoir.

3. In a fluid operated tractor-trailer braking system having a fluid pressure reservoir on the tractor, a fluid pressure reservoir on the trailer, brake chambers on the tractor and trailer, emergency and service lines connected with said tractor reservoir, said service line including a manually operated brake valve, and conduit means connecting said trailer reservoir with the brake chambers on said trailer, a normally closed valve in said conduit means, fluid pressure actuated means for opening said valve, second conduit means connecting said fluid pressure actuated means with said service line, a second normally open valve in said second conduit, third conduit means connecting said trailer reservoir with said fluid pressure actuated means, a third normally closed valve in said third conduit, means cooperating with said second valve and said third valve to close said second valve upon the opening of said third valve and vice versa, pressure responsive means connected with said emergency line, means operatively connecting said pressure responsive means with said third valve to open the same upon the fluid pressure in said emergency line falling to a predetermined value below the pressure in said trailer reservoir, and resilient means acting on said pressure responsive means to normally maintain the latter in a position to close said third valve.

4. The fluid operated tractor-trailer braking system of claim 3 including a restricted passage communicating said third conduit with said emergency line.

5. The fluid operated tractor-trailer braking system of claim 4 including a pressure operated check valve in said restricted passage permitting the passage of fluid from said emergency line to said third conduit when the fluid pressure in the former exceeds that in the trailer reservoir and closing said restricted passage when the pressure in the trailer reservoir exceeds that in the emergency line.

6. In a fluid operated tractor-trailer braking system having a fluid pressure reservoir on the tractor, a fluid pressure reservoir on the trailer, brake chambers on the tractor and trailer, emergency and service lines connected with said tractor reservoir, said service line including a manually operated brake valve, a relay emergency valve on said trailer comprising a valve body having a first chamber therein connected with said service line and a second chamber connected with said trailer brake chambers, a movable diaphragm separating said chambers, a normally open valve for controlling the connection between said service line and said first chamber, a fluid passage in said valve body connected with said trailer reservoir and having a connection with said second chamber, a second normally closed valve in the connection between said second chamber and said passage, an operative connection between said second valve and said diaphragm to open the former upon movement of the latter in one direction, a conduit connecting said passage with said first chamber, a third normally closed valve in said conduit, means cooperating with said third valve and said first valve to retain the former open when the latter is closed and vice versa, a third chamber in said valve body connected with said emergency line, movable pressure responsive means in said third chamber having one side exposed to the pressure in said emergency line and the other side exposed to the pressure in said passage, an operative connection between said third valve and said pressure responsive means, said pressure responsive means being moved by greater pressure in the passage than in the emergency line to move said third valve from its normally closed position to open position to admit fluid pressure from said passage through said conduit to said first chamber, and resilient means acting on said pressure responsive means to normally maintain the latter in a position to close said third valve.

7. In the fluid operated tractor trailer braking system of claim 6, wherein the relay-emergency valve includes a restricted passage in said body connecting said first passage with said third chamber.

8. In the fluid operated tractor-trailer braking system of claim 7, wherein a pressure operated check valve is positioned in said restricted passage permitting the flow of fluid from said emergency line to said first passage when the fluid pressure in the former exceeds that in the trailer reservoir and closing said restricted passage when the pressure in the trailer reservoir exceeds that in the emergency line.

9. In a fluid operated tractor-trailer braking system of the type having a main fluid pressure reservoir on the tractor, a fluid pressure reservoir on the trailer, brake chambers on the tractor and trailer, emergency and service lines connected with the tractor reservoir, and a brake valve in the service line on the tractor, a relay emergency valve on the trailer comprising a casing having a fluid pressure responsive member therein dividing the casing into an inlet chamber and an outlet chamber, means for connecting said emergency line with the trailer reservoir, a valve operable by movement of said member for connecting the trailer reservoir and outlet chamber, means including a check valve for connecting the service line to the inlet chamber so that fluid pressure conducted thereto will move said member and operate said valve to apply the trailer brakes in service, means defining a passage between the trailer reservoir and said inlet chamber, a differential valve device having a part normally closing said passage and having another part for positively opening said check valve, said valve device having an area constantly subjected to the fluid pressure in the emergency line and having another area smaller than said first area, subjected at all times to the fluid pressure in the trailer reservoir, and resilient means acting on said valve device for normally maintaining the latter in a position where the first named part closes said passage and the second named part opens said check valve.

References Cited in the file of this patent
UNITED STATES PATENTS

| | | |
|---|---|---|
| 2,024,343 | Eaton | Dec. 17, 1935 |
| 2,411,406 | Affleck | Nov. 19, 1946 |
| 2,441,050 | Wiegers | May 4, 1948 |
| 2,636,576 | Affleck | Apr. 28, 1953 |
| 2,656,014 | Fites | Oct. 20, 1953 |